Figure 1:
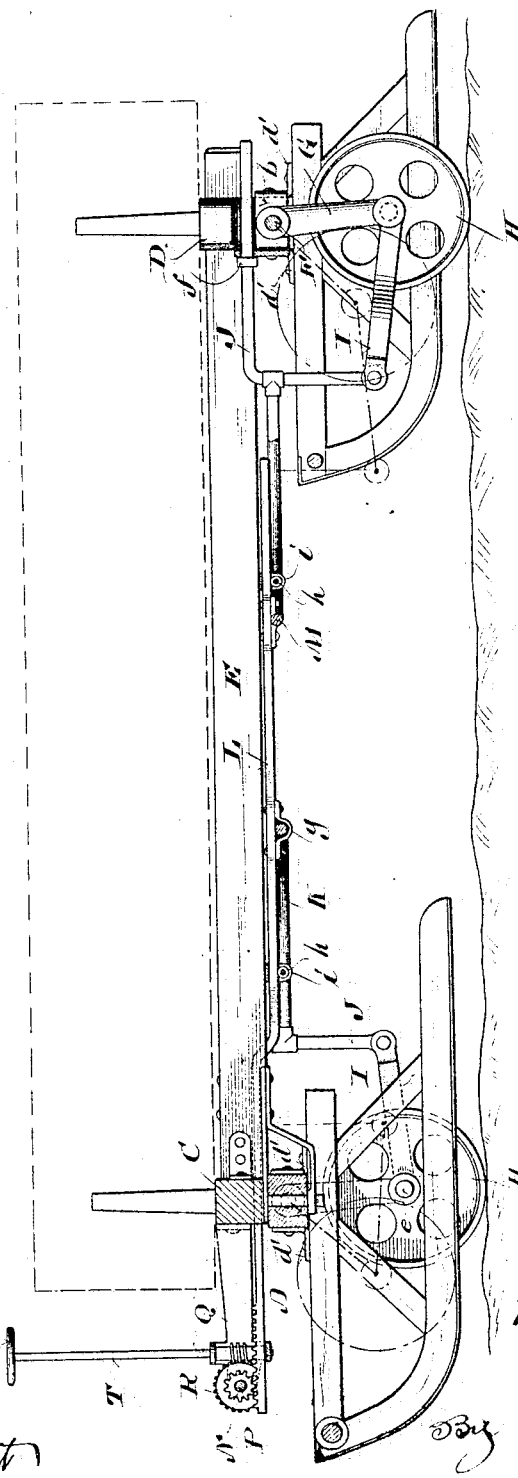

No. 766,290. PATENTED AUG. 2, 1904.
W. A. SHEPHARD.
SLED.
APPLICATION FILED MAY 7, 1904.
NO MODEL. 3 SHEETS—SHEET 1.

Witnesses
Geo. W. Young,
N. E. Oliphant

Inventor
Wm. A. Shephard
By H. G. Underwood
Attorneys

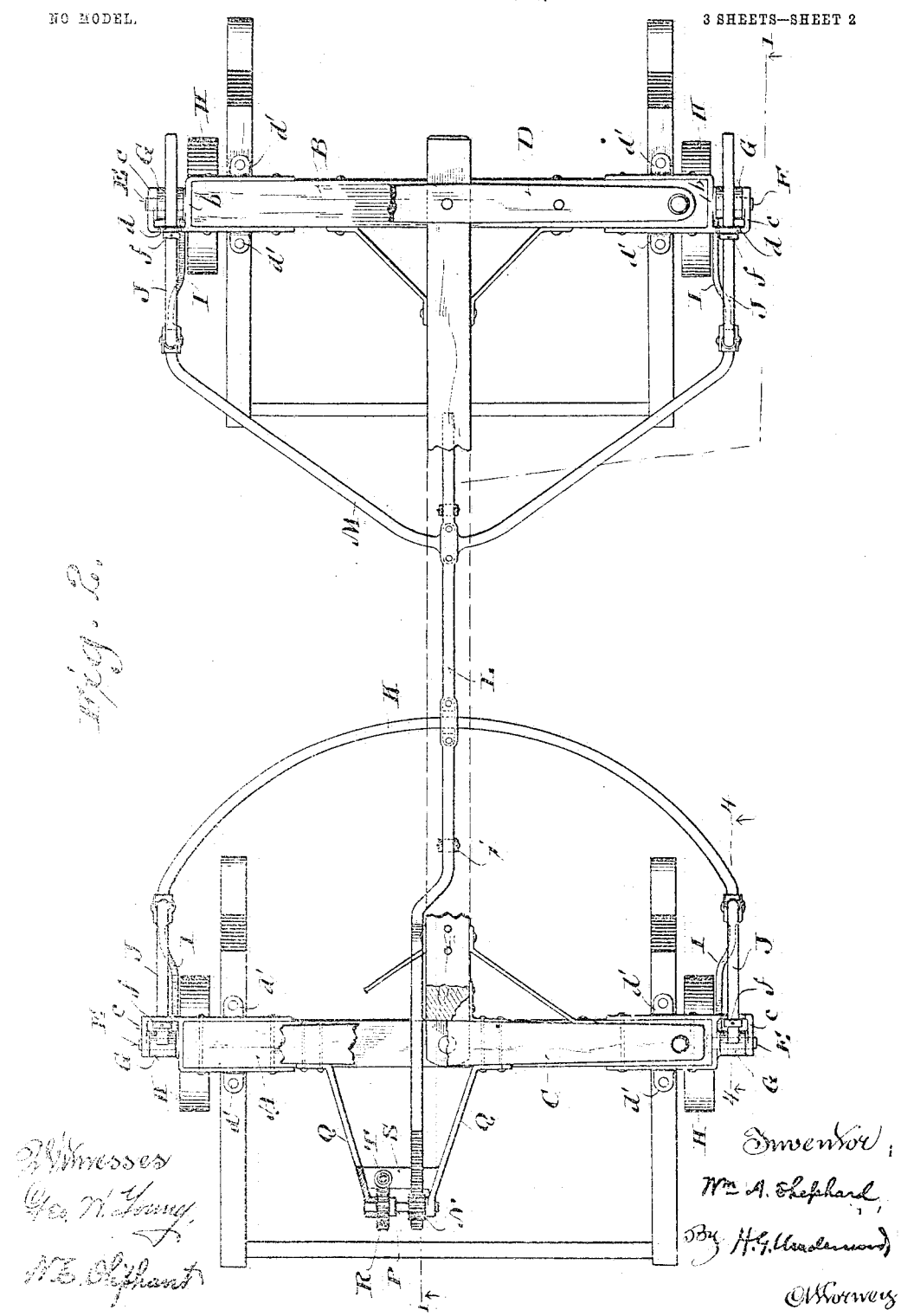

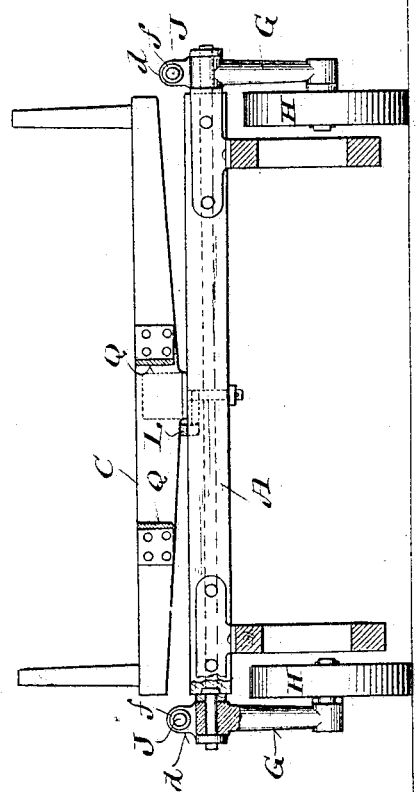
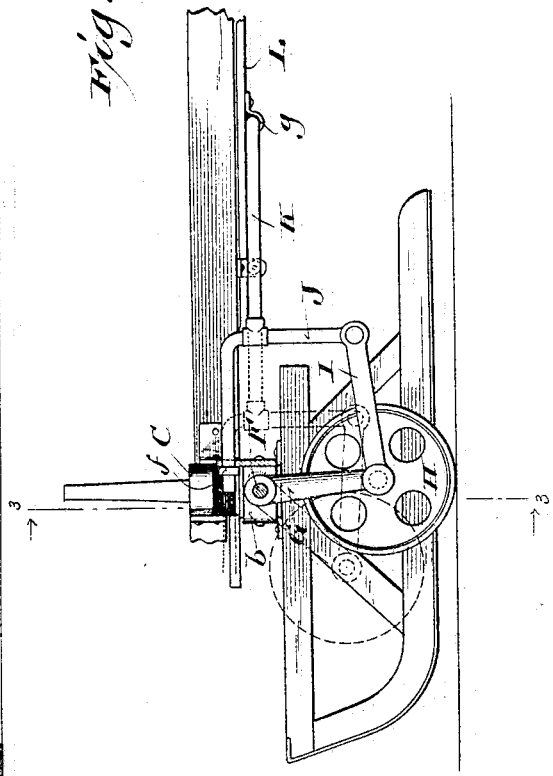

No. 766,290. Patented August 2, 1904.

UNITED STATES PATENT OFFICE.

WILLIAM A. SHEPHARD, OF WAUKESHA, WISCONSIN.

SLED.

SPECIFICATION forming part of Letters Patent No. 766,290, dated August 2, 1904.

Application filed May 7, 1904. Serial No. 206,839. (No model.)

*To all whom it may concern:*

Be it known that I, WILLIAM A. SHEPHARD, a citizen of the United States, and a resident of Waukesha, in the county of Waukesha and State of Wisconsin, have invented certain new and useful Improvements in Sleds; and I do hereby declare that the following is a full, clear, and exact description thereof.

My invention has for its object to provide simple, economical, and efficient means in connection with a pair of coupled bob-sleds by which to readily convert the same at any time into a vehicle on wheels, said invention being hereinafter more particularly set forth with reference to the accompanying drawings and subsequently claimed.

Figure 1 of the drawings represents a partly-sectional side elevation of a pair of coupled bob-sleds and means in connection therewith for converting the same into a vehicle on wheels, the view being indicated by lines 1 1 in the second figure and illustrating the conversion; Fig. 2, a plan view of what is shown in the preceding figure, parts being broken away; Fig. 3, a transverse sectional view indicated by line 3 3 in the fourth figure; and Fig. 4, a vertical longitudinal section of a fragment of the vehicle, this view being indicated by line 4 4 in said second figure.

Referring by letter to the drawings, A represents the beam of a forward bob-sled; B, the beam of a rear bob-sled; C D, bolsters on the beams, and E a reach connecting the bolsters. The beam of the forward bob-sled is put into swivel connection with the overlying bolster C, as is customary, and suitable braces are employed in connection with the reach and both bolsters, as is also customary. The ends of the sled-beams A B are bolted in angular brackets that abut the ends of said bolsters and extend along their sides. One side of each bracket extends outward from the head *b* of same, that abuts the end of the corresponding sled-beam, and this extension is bent at a right angle to form an arm *c*, parallel to said head. Between its head *b* and arm *c* each bracket is provided with an upper apertured lug *d*, and a spindle F is supported by said head and arm, the inner end of this spindle being enlarged and engaged with a recess provided in the corresponding end of a side beam. Ears *d'* of the brackets are bolted to the sled-fenders.

Loose on each spindle is the upper end of a crank G, provided with an inner lower stud *e*, on which a wheel H is arranged to turn, the wheel being held upon the stud by any suitable means. Between each crank and the adjacent wheel one end of a link I is engaged by the stud on which said wheel has its bearing, and the other end of the link is shackled to the depending vertical arm of a bent rod J, there being a horizontal arm of this rod loose in the lug *d* of one of the brackets aforesaid. A stop-collar *f* is provided on this horizontal arm of each angle-rod J to at times abut the guide for same.

The ends of a circle-bar K are coupled to the rods J that pertain to the forward bob-sled, and this circle-bar plays loose in a clip *g*, depending from a rack-bar L, guided on anti-friction-rollers *h*, hung in yokes *i*, suspended from the reach above specified. Clipped fast to the rack-bar L is a suitably-bent rod M, coupled at its ends to the rods J pertaining to the rear bob-sled.

Meshed with the forward rack end of the bar L is a pinion N, rigid on an arbor P, that has its bearings in the forward ends of a pair of arms Q, made fast at their rear ends to the front bolster. A worm-wheel R is also rigid on the arbor. One of the arms Q and a brace S, connecting both of said arms, are provided with bearings for a vertical worm-shaft T, in mesh with the worm-wheel, this shaft being provided with an upper crank or hand-wheel U convenient to the driver of the vehicle.

The worm-shaft is operated in one direction to cause backward movement of the bar L in connection, through the circle-bar K and rod M, with the right-angle rods J, and these rods being connected by the links I with the studs *e* of the cranks G said cranks are moved out of normal position (indicated by dotted lines in Fig. 1) to swing the wheels H down to working position, the bob-sleds and load thereon being correspondingly lifted to bring the runners of said sleds off the adjacent surface on which they would otherwise travel, the throw of the aforesaid cranks being limited by the stop-collars $f$ of the aforesaid rods coming into contact with the guide-lugs $d$ of the brackets that are fastened to the ends of the sled-beams. Reverse operation of the rack-bar results in throwing the wheels out of working position and lowering the bobsleds, with their load, until the runners of said sleds are again on the opposing surface.

From the foregoing it will be understood that the vehicle can be readily converted from one on runners to one on wheels in order to ease the travel of same over bare places occuring in snow or ice roads, and this conversion does not interfere with the pivotal turning play of the forward bob-sled. It also follows that the conversion of the vehicle from a sled to a truck makes it practical to utilize the vehicle as a carrier at all times.

While I have shown what is now a preferred means for swinging the cranks to bring the wheels therewith in and out of working position, other means may be devised for the same purpose without departure from my invention, and my improvements may be applied to a single long sled as well as to a pair of coupled bob-sleds.

Having thus described my invention, what I claim as new, and desire to secure by Letters Patent, is—

1. A sled, spindles in connection with ends of the sled-beams, cranks loose on the spindles, wheels carried by the cranks, and means for actuating the cranks to bring the wheels on and off the opposing surface, said sled being lifted clear of said surface when said wheels are swung into working position.

2. A pair of coupled bob-sleds, spindles in connection with ends of the sled-beams, cranks loose on the spindles, wheels carried by the cranks, and means for actuating the cranks to bring the wheels on and off the opposing surface, said sleds being lifted clear of said surface when said wheels are swung into working position.

3. A pair of coupled bob-sleds, brackets attached to the ends of the sled-beams, guide-lugs on the brackets, cranks loose on spindles in the brackets, wheels carried by the cranks, angle-rods engaging the guide-lugs of said brackets, links connecting said cranks and rods, and means in connection with the aforesaid rods for actuating the aforesaid cranks to bring the wheels on and off opposing surface, said sleds being lifted clear of said surface when said wheels are swung into working position.

4. A pair of coupled bob-sleds, brackets attached to the ends of the sled-beams, guide-lugs on the brackets, cranks loose on spindles in the brackets, wheels carried by the cranks, angle-rods engaging the guide-lugs of said brackets, stop-collars on the angle-rods forward of said guide-lugs to at times abut the same, links connecting said cranks and angle-rods, and means in connection with these rods for actuating the aforesaid cranks to bring the wheels on and off opposing surface, said sleds being lifted clear of said surface when said wheels are swung into working position.

5. A pair of coupled bob-sleds, brackets attached to the ends of the sled-beams, angle-rods for which the brackets are provided with guide-lugs, cranks loose on spindles in said brackets, wheels carried by the cranks, links connecting the cranks and angle-rods a rack-bar, in rigid connection with the rear angle-rods, a circle-bar having loose play in connection with said rack-bar and coupled at its ends to the forward angle-rods, a rack-bar pinion fast on a suitably-arranged arbor, and means for rotating the arbor.

6. A pair of coupled bob-sleds, cranks hung from ends of the sled-beams, angle-rods guided in connection with said beams and linked to the cranks, a thrust-bar in rigid connection with the rear angle-rods, a circle-bar having loose play in connection with the bar aforesaid and coupled at its ends to the forward angle-rods, and means for reciprocating the thrust-bar.

In testimony that I claim the foregoing I have hereunto set my hand, at Waukesha, in the county of Waukesha and State of Wisconsin, in the presence of two witnesses.

WILLIAM A. SHEPHARD.

Witnesses:
WILLIAM THOMPSON,
FRANK L. GILMAN.